US008899031B2

(12) United States Patent
Turnis et al.

(10) Patent No.: US 8,899,031 B2
(45) Date of Patent: Dec. 2, 2014

(54) COLD START VALVE

(75) Inventors: Justin J. Turnis, Manchester, IA (US); John R Mahrenholz, Peosta, IA (US)

(73) Assignee: Deere & Company, Moline, IL (US)

( * ) Notice: Subject to any disclaimer, the term of this patent is extended or adjusted under 35 U.S.C. 154(b) by 961 days.

(21) Appl. No.: 13/028,845

(22) Filed: Feb. 16, 2011

(65) Prior Publication Data

US 2012/0204548 A1 Aug. 16, 2012

(51) Int. Cl.
*F16D 31/02* (2006.01)
*F15B 21/04* (2006.01)
*E02F 9/22* (2006.01)

(52) U.S. Cl.
CPC ............. *E02F 9/2246* (2013.01); *F15B 21/045* (2013.01); *E02F 9/2267* (2013.01); *E02F 9/226* (2013.01)
USPC ............................................... 60/329; 60/468

(58) Field of Classification Search
CPC ..... F15B 21/042; F15B 21/045; E02F 9/2267
USPC .............. 60/329, 468, 431, 459, 463; 417/46, 417/278, 292; 123/179.15, 464, 435
See application file for complete search history.

(56) References Cited

U.S. PATENT DOCUMENTS

| | | | | |
|---|---|---|---|---|
| 5,052,359 | A * | 10/1991 | Hardwick et al. | 123/406.45 |
| 5,338,161 | A * | 8/1994 | Eley | 417/307 |
| 5,339,776 | A * | 8/1994 | Regueiro | 123/196 CP |
| 6,866,025 | B1 * | 3/2005 | Maass | 123/450 |
| 7,134,406 | B1 * | 11/2006 | Loes | 123/41.11 |
| 7,849,688 | B2 * | 12/2010 | Dvorak et al. | 60/456 |
| 8,234,860 | B2 * | 8/2012 | Beschorner et al. | 60/329 |
| 8,347,618 | B2 * | 1/2013 | Dostal et al. | 60/428 |
| 8,555,843 | B2 * | 10/2013 | Klousia et al. | 123/179.15 |
| 2007/0028881 | A1 * | 2/2007 | Nakata et al. | 123/179.15 |
| 2010/0281859 | A1 * | 11/2010 | Oka | 60/459 |

* cited by examiner

*Primary Examiner* — Michael Leslie

(57) ABSTRACT

Parasitic hydraulic loading on an engine is significantly reduced during cold starts by using an unloader valve to divert the flow of hydraulic fluid from a hydraulic pump to a hydraulic actuator, i.e., load source, recirculating the hydraulic fluid between the hydraulic pump and the unloader valve.

17 Claims, 3 Drawing Sheets

FIG. 3
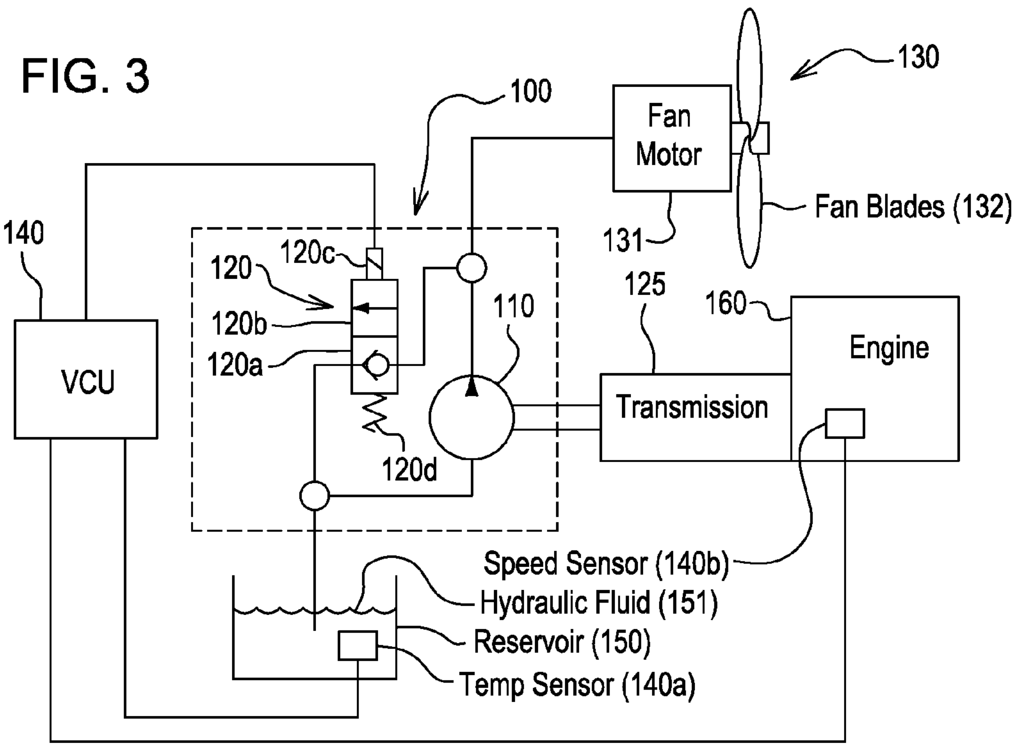
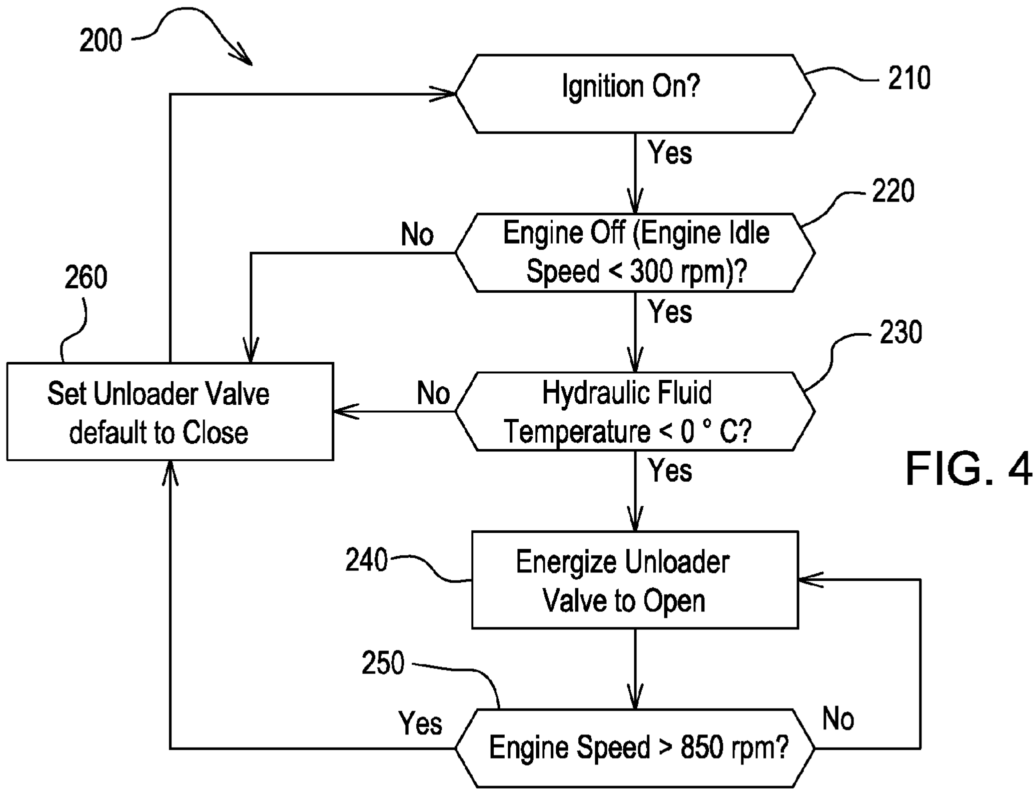
FIG. 4

COLD START VALVE

FIELD OF THE INVENTION

This disclosure relates to hydraulic unloading valves and, more particularly, to hydraulic unloading valves suitable for relieving the load form a hydraulic pump, and, thereby, an engine under certain conditions such as, for example, cold starts.

BACKGROUND OF THE INVENTION

Off road equipment such as diesel powered work vehicles can from time to time experience difficulties making cold starts at cold temperatures such as, for example, temperatures less than 0° C. This can, inter alia, result from a combination of: (1) greater difficulties starting an unloaded engine at cold temperatures; and (2) the contiguous application of parasitic loading (e.g., hydraulic loading) on the engine at startup. As engines become more and more fine tuned to the work requirements of the vehicle, i.e., built and tuned to maximize work efficiency as well as energy efficiency, demanding starting conditions may become a more critical challenge for all.

SUMMARY OF THE INVENTION

Described herein is an invention that improves the conditions under which cold starts are made by significantly lowering the parasitic loading on the engine. The parasitic loading is lowered by reducing hydraulic loads on the engine via unloading valves.

BRIEF DESCRIPTION OF THE DRAWINGS

FIG. 3 is an exemplary view of a hydraulic circuit utilizing the invention; and FIG. 4 illustrates an exemplary flow chart for the invention.

DESCRIPTION OF THE PREFERRED EMBODIMENT

Figure 1:
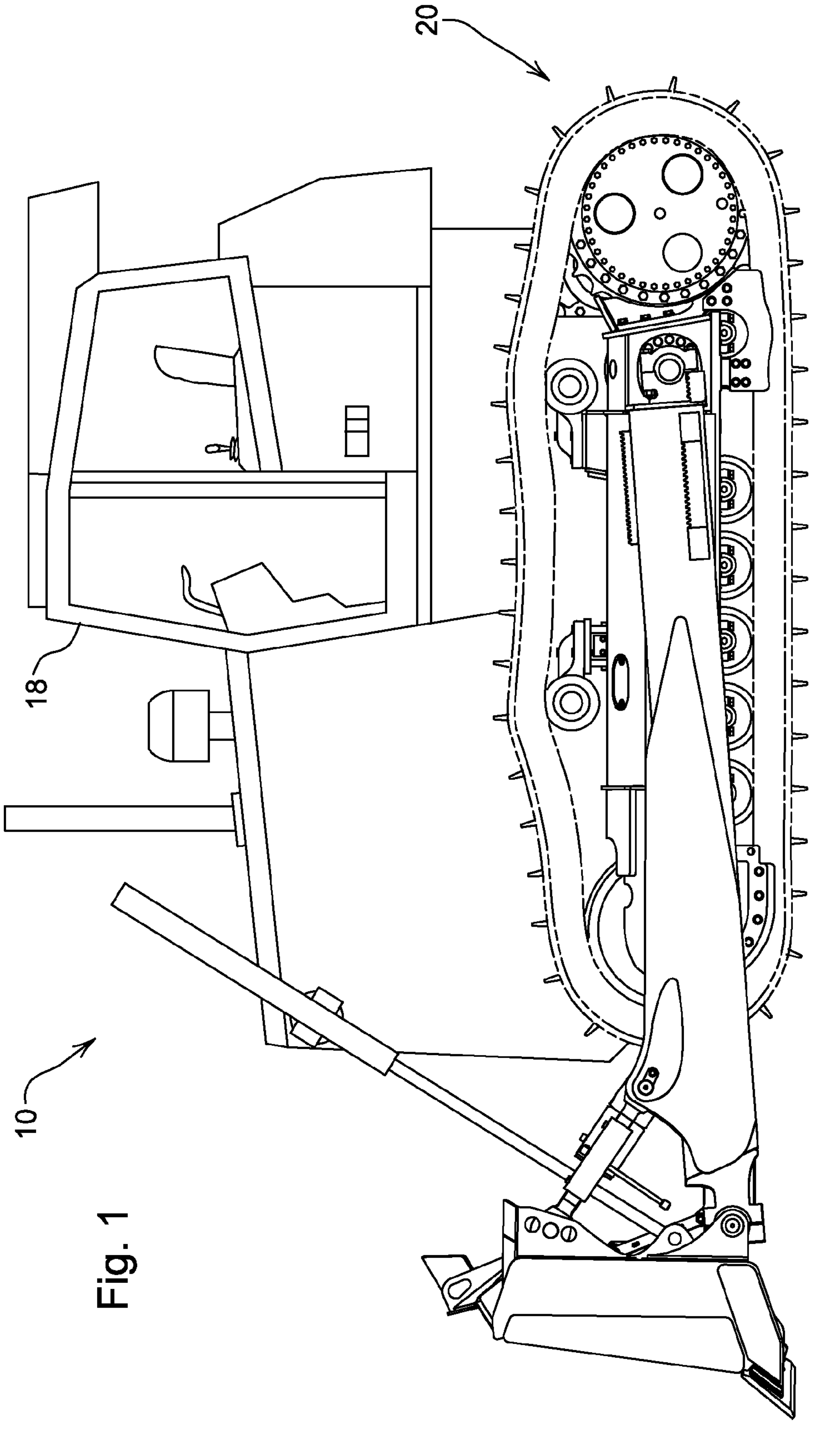
FIG. 1 is an illustrative example of a work vehicle on which the invention may be used for cold starts.
Figure 2:
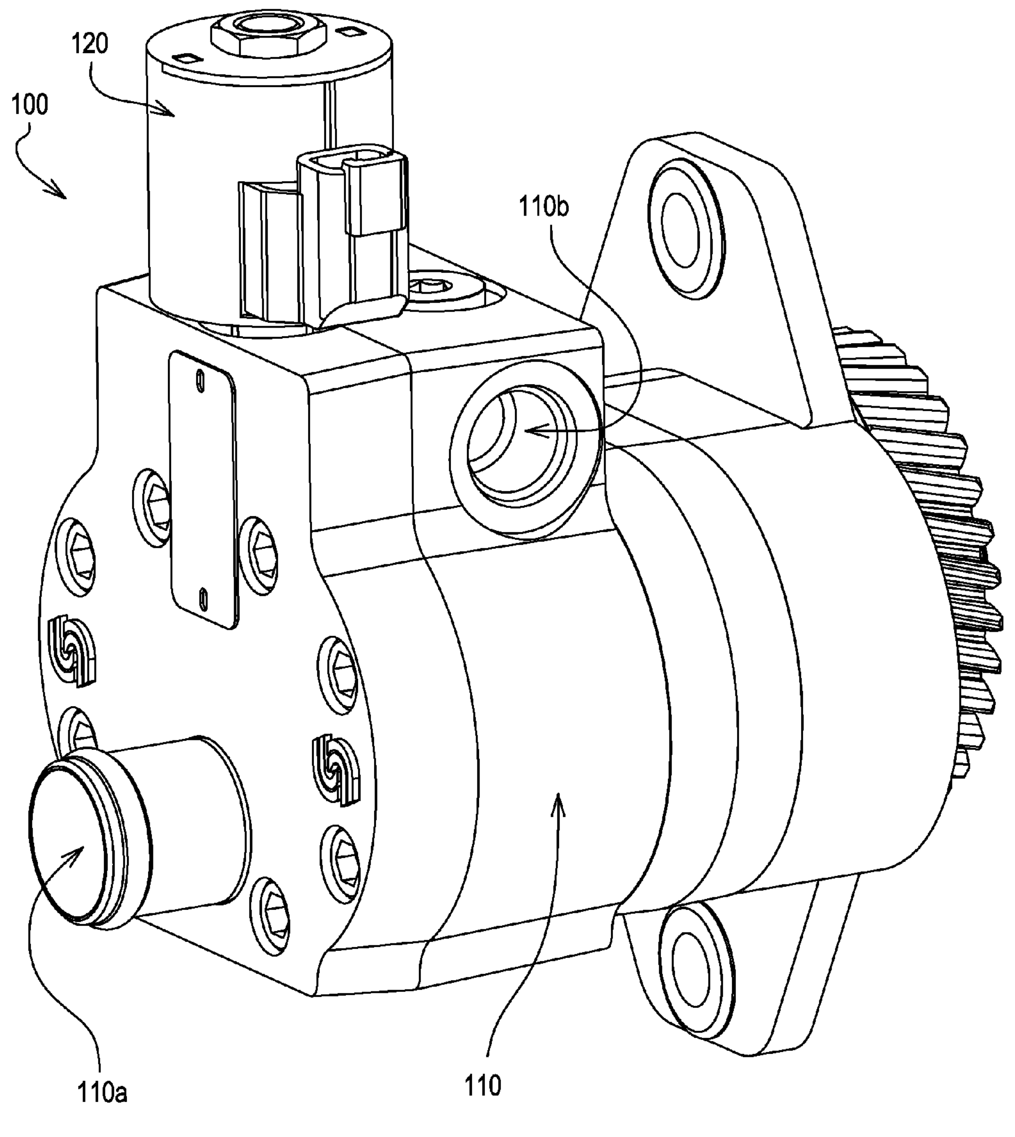
FIG. 2 is a perspective view of an exemplary hydraulic pump and integrated unloader valve.

FIG. 1 illustrates a work vehicle 10, having a cab 18 and ground engaging means 20, that may incorporate the invention for the purpose of improving cold starts. In such vehicles there may be many parasitic hydraulic loads, e.g., pumps for hydraulic fans, hydrostatic charge pumps, etc. Parasitic hydraulic loads may be significantly reduced via the use of unloader valves to relieve hydraulic loads in areas where functionality requiring such hydraulic loads may be, at the time, non-essential. FIG. 2 illustrates an exemplary integrated hydraulic fan pump 100 having a pump portion 110 and an unloader valve portion 120. While unloading may be accomplished in a non-integrated fashion, such integration may save valuable space via its compactness, increase reliability via reducing the number of exposed and connected parts, and increase efficiency via a reduction in the travel distance of hydraulic oil.

FIG. 3, is an illustration of a system showing an exemplary embodiment of the integrated hydraulic pump 100 operably connected to an engine 160, which may be, in this embodiment, via a conventional mechanical connection to a transmission 125; and a vehicle controller unit (VCU) 140 which may be in electrical communication with a temperature sensor 140*a* located in hydraulic fluid reservoir 150 for detecting the temperature of hydraulic fluid 151 and an engine speed sensor 140*b* which, in this embodiment, may be located within the engine 160. As illustrated, the integrated hydraulic fan pump 100 may include a pump portion 110 having an inlet 110*a* and an outlet 110*b* and an unloader valve portion 120. The unloader valve portion 120 may have a closed position 120*a*, an open position 120*b*, an actuator which is, in this case, a solenoid 120*c*, and a biasing device which is, in this embodiment, a spring 120*d*. As illustrated, the unloader valve portion 120 may be biased to the closed position 120*a* via the spring 120*d* or other device; it may move to the open position 120*b* upon being energized by an electrical signal from the VCU 140 to its solenoid 120*c* or via some other method. As illustrated, a hydraulic fan 130 having a hydraulic fan motor 131 and fan blades 132 may be powered by pressurized hydraulic fluid 151 from the outlet 110*b*. The VCU 140 may continually monitor input from the temperature sensor 140*a* and the engine speed sensor 140*b*. Also included in this embodiment is a conventional ignition (not shown) having on and off positions and a conventional starter for the engine. In this embodiment, the engine 160 is started via conventional means.

As illustrated, when the unloader valve portion 120 is, by default, in the closed position 120*a*, the hydraulic fluid 151 pressurized by the pump portion 110 may flow directly to the hydraulic fan motor 131, thereby biasing the system, i.e., the integrated hydraulic pump 100 toward conventional vehicle operating conditions, i.e., greater hydraulic loads when the unloader valve portion 120 is not energized.

When the ignition is on, the engine 160 is off, i.e., when the engine speed detected by the speed sensor 140*b* is less than a predetermined speed value (300 rpm in this embodiment), and the temperature of the hydraulic fluid, as detected by the temperature sensor 140*a*, is less than a predetermined temperature value of, for example, 0° C. as in this embodiment, the VCU 140 signals the unloader valve portion 120 to move to the open position 120*b*, thereby allowing hydraulic fluid 151 to flow through the unloader valve portion 120. This arrangement may keep the inlet 110*a* and outlet 110*b* to the pump portion open but allow a significant amount of hydraulic oil moved by the pump portion 110 to recirculate between the pump portion 110 and the unloader valve portion 120 and, thereby, significantly reduce hydraulic loading from the fan motor 131 as fluids tend to take the path of least resistance which may be, in this case, the path between the pump portion 110 and the unloader valve portion 120.

When the engine 160 has achieved a speed greater than 850 rpm as detected by the engine speed sensor 140*b*, or the hydraulic fluid 151 has a temperature greater than or equal to 0° C. as detected by the temperature sensor 140*a*, the VCU 140 stops the energizing signal to the unloader valve portion 120 allowing the unloader valve portion 120 to move to the closed position 120. Once the unloader valve portion 120 is in the closed position 120*b*, the hydraulic fluid may cease to recirculate between the pump portion 110 and the unloader valve portion 120 and follow the new path of least resistance, i.e., moving from the pump portion 110 to the hydraulic fan motor 131. The unloader valve portion 120 may remain in the closed position until the following three conditions are met: (1) the ignition is on; (2) the engine speed is less than 300 rpm; and (3) the detected temperature of the hydraulic fluid 151 is less than 0° C.

The actions above are captured in the logic of the program/routine 200 followed by the VCU 140 as illustrated in the flow chart of FIG. 4. As illustrated in FIG. 4, if the ignition is on at 210 and the engine is off, i.e., the engine speed is less than 300 rpm, at 220, and the temperature of the hydraulic fluid 151 is less than 0° C. at 230, unloader valve portion 120 is energized to open at 240. As illustrated, the unloader valve 120 is energized to remain open until the engine 160 achieves an engine speed greater than the predetermined speed of 850 rpm. Once the engine speed is greater than 850 rpm, the unloader valve portion 120 is de-energized and allowed to close at 260, i.e., the VCU 140 ceases to energize the unloader valve portion 120. If, at 220, the engine speed is greater than or equal to 300 rpm, or at 230, the temperature of the hydraulic fluid 151 is greater than or equal to 0° C., the unloader valve 120 is set to close.

Having described the preferred embodiment, it will become apparent that various modifications can be made without departing from the scope of the invention as defined in the accompanying claims. The invention has been described as an integral hydraulic pump and valve arrangement but would work if the pump portion 110 and the unloader valve portion 120 were, not integrated, i.e., physically separated, yet in fluid communication with each other.

The invention claimed is:

1. A work vehicle comprising:
an ignition;
an engine;
a hydraulic motor;
an integrated hydraulic pump having a pump portion and a valve portion, the valve portion having a first position blocking hydraulic fluid from recirculating between the pump portion and the valve portion, a second position allowing hydraulic fluid to recirculate between the pump portion and the valve portion without exiting the integrated hydraulic pump, and an actuator for moving the valve portion to the second position, the pump portion operably connected to the engine;
an engine speed sensor for detecting an engine speed;
a temperature sensor for detecting a temperature of hydraulic fluid; and
a vehicle controller unit in communication with the engine speed sensor, the temperature sensor and the actuator, the vehicle controller unit configured to energize the actuator and move the valve portion from the first position to the second position when (1) the ignition is on, (2) the engine speed is lower than a first predetermined engine speed, and (3) the temperature is below a predetermined temperature, the vehicle controller unit configured to cease energizing the actuator of the valve portion when the engine speed is above a second predetermined engine speed greater than the first predetermined engine speed.

2. The work vehicle of claim 1, wherein the first position is a closed position.

3. The work vehicle of claim 1, wherein the second position allows hydraulic fluid to flow from an outlet of the pump portion to an inlet of the pump portion.

4. The work vehicle of claim 1, wherein the actuator is a solenoid.

5. The work vehicle of claim 1, further comprising a spring biasing the valve portion to the first position.

6. The work vehicle of claim 1, wherein the first predetermined engine speed is 300 rpm.

7. The work vehicle of claim 1, wherein the second predetermined engine speed is 850 rpm.

8. The work vehicle of claim 1, wherein the predetermined temperature is 0° C.

9. A work machine comprising:
an ignition;
an engine;
a hydraulic motor;
an integrated hydraulic pump having a pump portion and a valve portion, the valve portion having a first position blocking hydraulic fluid from recirculating between the pump portion and the valve portion, a second position allowing hydraulic fluid to recirculate between the pump portion and the valve portion without exiting the integrated hydraulic pump, and an actuator for moving the valve portion to the second position, the pump portion operably connected to the engine;
an engine speed sensor for detecting an engine speed;
a temperature sensor for detecting a temperature of hydraulic fluid; and
a vehicle controller unit in communication with the engine speed sensor, the temperature sensor and the actuator, the vehicle controller unit configured to energize the actuator to move the valve portion from the first position to the second position when (1) the ignition is on, (2) the engine is off, and (3) the temperature is below a predetermined temperature, the vehicle controller unit configured to cease energizing the actuator of the valve portion when the engine speed is above a predetermined engine speed.

10. The work machine of claim 9, wherein the first position is a closed position.

11. The work machine of claim 9, wherein the second position allows hydraulic fluid to flow from an outlet of the pump portion to an inlet of the pump portion.

12. The work machine of claim 9, wherein the actuator is a solenoid.

13. The work machine of claim 9, further comprising a spring biasing the valve portion to the first position.

14. A method of reducing parasitic loading during a startup of a work vehicle having an engine, an engine speed sensor for detecting an engine speed, a temperature sensor for detecting a temperature of hydraulic fluid, a hydraulic motor, a hydraulic pump, a hydraulic valve in proximity to the hydraulic pump and having an open position and a closed position, and a vehicle controller unit, the method comprising the following steps:
a. using the engine speed sensor to determine if the engine speed is below a first predetermined engine speed;
b. using the temperature sensor to determine if the temperature of the hydraulic fluid is below a predetermined temperature; and
c. using the hydraulic valve to cause hydraulic fluid moved by the hydraulic pump to be diverted from the hydraulic motor and to recirculate between the hydraulic pump and the hydraulic valve without returning to a hydraulic reservoir when the engine speed is below the first predetermined engine speed in step a and the temperature is below the predetermined temperature of step b.

15. The method of claim 14, further comprising using the hydraulic valve to cease recirculation of the hydraulic fluid between the hydraulic pump and the hydraulic valve without returning to the hydraulic reservoir when the engine speed is above a second predetermined engine speed greater than the first predetermined engine speed.

16. The method of claim 14 wherein the first predetermined engine speed is 300 rpm.

17. The method of claim 15 wherein the second predetermined engine speed is 850 rpm.

* * * * *